(12) United States Patent
Sasaki (10) Patent No.: US 10,041,823 B2
(45) Date of Patent: Aug. 7, 2018

(54) THERMAL MASS FLOW METER AND MASS FLOW CONTROLLER

(71) Applicant: Hitachi Metals, Ltd., Minato-ku, Tokyo (JP)

(72) Inventor: Akira Sasaki, Mie (JP)

(73) Assignee: HITACHI METALS, LTD., Tokyo (JP)

( * ) Notice: Subject to any disclaimer, the term of this patent is extended or adjusted under 35 U.S.C. 154(b) by 49 days.

(21) Appl. No.: 14/908,415

(22) PCT Filed: Jul. 25, 2014

(86) PCT No.: PCT/JP2014/069641
§ 371 (c)(1),
(2) Date: Jan. 28, 2016

(87) PCT Pub. No.: WO2015/019863
PCT Pub. Date: Feb. 12, 2015

(65) Prior Publication Data
US 2016/0178420 A1   Jun. 23, 2016

(30) Foreign Application Priority Data

Aug. 9, 2013 (JP) ................................. 2013-165786

(51) Int. Cl.
*G01F 1/69* (2006.01)
*B23K 11/11* (2006.01)
(Continued)

(52) U.S. Cl.
CPC ............. *G01F 1/69* (2013.01); *B23K 11/115* (2013.01); *B23K 11/163* (2013.01); *B23K 11/18* (2013.01);
(Continued)

(58) Field of Classification Search
CPC ................................................. B23K 11/163
See application file for complete search history.

(56) References Cited

U.S. PATENT DOCUMENTS 4,517,838 A * 5/1985 Wachi .................. G01F 1/6847
73/204.22
4,870,240 A * 9/1989 Fiedelius ........... H01R 43/0214
219/56.1

(Continued)

FOREIGN PATENT DOCUMENTS

JP    57-211255    12/1982
JP    59-88622     5/1984
(Continued)

OTHER PUBLICATIONS

"Electric resistance welding" from Wikipedia, as captured by the Wayback Machine Internet Archive on Nov. 30, 2012.*
(Continued)

*Primary Examiner* — Justin Olamit
(74) *Attorney, Agent, or Firm* — Neugeboren O'Dowd, PC (57) ABSTRACT

A mass flow controller and mass flow meter are disclosed. The mass flow controller and mass flow meter include a sensor tube configured to transport a fluid, and an upstream heater element and a downstream heater element which are formed of heating resistance wires provided in an outer periphery of the sensor tube. At least one weld terminal is electrically connected to an end of one or more of the heating resistance wires by spot welding material. A temperature difference between the melting point of the weld terminal and a melting point of the heating resistance wires does not exceed 100 degrees Celsius, and one or more coat layer(s) is provided on a surface of the weld terminal.

10 Claims, 6 Drawing Sheets

(51) Int. Cl.
  *B23K 11/16* (2006.01)
  *B23K 11/18* (2006.01)
  *B23K 11/20* (2006.01)
  *B23K 11/34* (2006.01)
  *H01R 4/02* (2006.01)
  *G01F 1/684* (2006.01)
  *B23K 101/38* (2006.01)
  *B23K 103/12* (2006.01)
  *B23K 103/18* (2006.01)

(52) U.S. Cl.
  CPC .............. *B23K 11/20* (2013.01); *B23K 11/34* (2013.01); *G01F 1/6847* (2013.01); *H01R 4/023* (2013.01); *B23K 2201/38* (2013.01); *B23K 2203/12* (2013.01); *B23K 2203/18* (2013.01); *B23K 2203/26* (2015.10)

(56) References Cited

U.S. PATENT DOCUMENTS

| | | | |
|---|---|---|---|
| 5,258,597 A | | 11/1993 | Urushibata et al. |
| 5,309,762 A | * | 5/1994 | Satoh .................. G01F 5/00 73/202.5 |
| 5,347,861 A | | 9/1994 | Satoh |
| 6,318,171 B1 | | 11/2001 | Suzuki |
| 8,356,623 B2 | * | 1/2013 | Isobe .................. G01F 1/6842 137/486 |
| 2008/0156776 A1 | | 7/2008 | Murakami |

FOREIGN PATENT DOCUMENTS

| | | |
|---|---|---|
| JP | 03099230 A | 4/1991 |
| JP | 03-238178 | 10/1991 |
| JP | 05-020264 A | 1/1993 |
| JP | 05-166575 | 7/1993 |
| JP | 08-105776 | 4/1996 |
| JP | 2004-293663 | 10/2004 |
| JP | 2008-137033 A | 6/2008 |
| JP | 2008-218189 | 9/2008 |
| JP | 2010033790 A | 2/2010 |

OTHER PUBLICATIONS

JIPO, "International Search Report for International Application Serial No. PCT/JP2014/069641", Oct. 28, 2014, Published in: PCT.
Taniyama, Toshio, "Japanese Office Action Re Application No. 2013-165786", May 30, 2017, p. 14 Published in: JP.
Japanese Patent Office, "Decision to Grant a Patent for JP 2013-165786," dated Aug. 29, 2017, 6 pages, published in JP.

* cited by examiner

THERMAL MASS FLOW METER AND MASS FLOW CONTROLLER

This application is the national phase under 35 U.S.C. § 371 of PCT International Application No. PCT/JP2014/069641 which has an International filing date of Jul. 25, 2014 and designated the United States of America.

BACKGROUND

Technical Field

The present invention is an invention relating to a thermal mass flow meter used to measure a mass flow of a fluid, and to a mass flow controller in which the thermal mass flow meter is incorporated.

Description of Related Art

The mass flow controller is widely used in order to control an amount of a process gas to be supplied to a chamber in a manufacturing process of a semiconductor. The mass flow controller comprises a mass flow meter for monitoring a mass flow, a control valve for controlling a mass flow, and a control circuit, and the like. Although there are various kinds of mass flow meters, among others, a thermal mass flow meter has the characteristics of theoretically allowing the correct measurement of a mass flow. For this reason, the thermal mass flow meter is widely prevalent as a mass flow meter incorporated in the mass flow controller for use.

Figure 1:
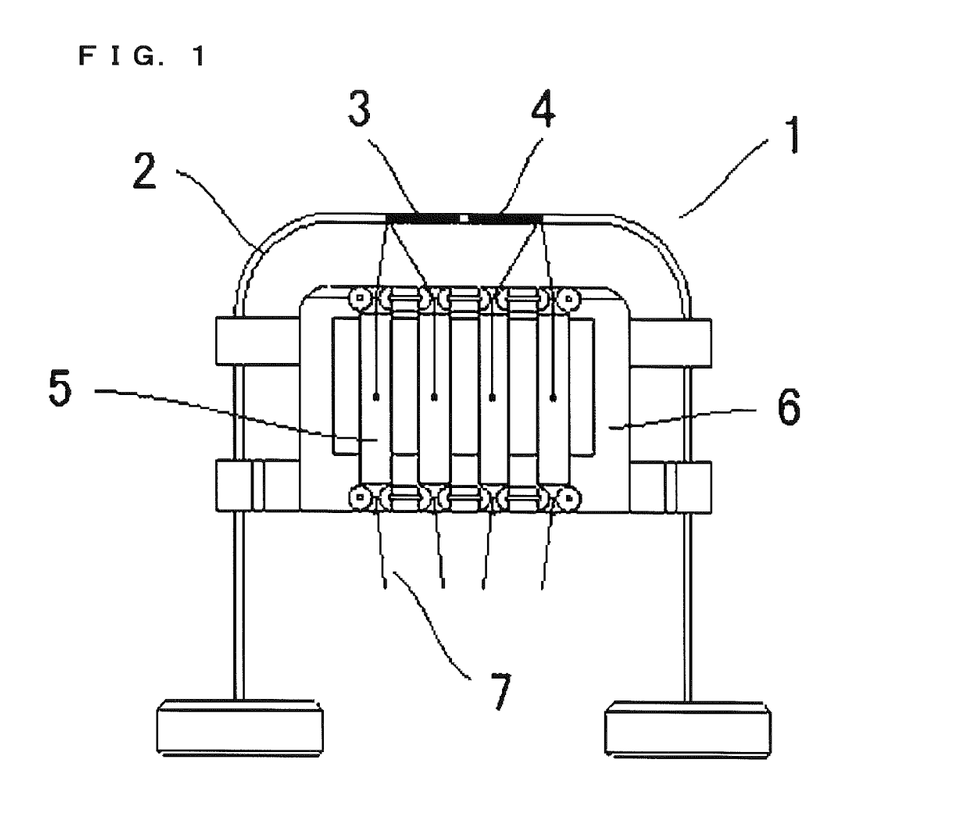
FIG. 1 is a schematic view showing a structure of a sensor section of a thermal mass flow meter.

FIG. 1 is a schematic view showing a structure of a sensor section of a thermal mass flow meter. The sensor section 1 of the thermal mass flow meter is provided with a sensor tube 2 in which a fluid flows, with an upstream heater element 3 and a downstream heater element 4 which are formed of heating resistance wires arranged in an outer periphery of the sensor tube 2, and with a plurality of weld terminals 5 to which ends of the heating resistance wires is electrically connected by spot welding. A current is passed through the upstream heater element 3 and the downstream heater element 4, and a fluid flowing in the sensor tube 2 is thereby heated. Since a fluid flows from the upstream toward the downstream and accordingly the heat applied to the fluid also move from the upstream toward the downstream, a temperature distribution of the sensor section 1 is changed and electric resistances of the upstream heater element 3 and the downstream heater element 4 are changed. The changes of the electric resistances are measured, which can detect a mass flow of the fluid flowing in the sensor tube 2.

The ends of the heating resistance wires constituting the upstream heater element 3 and the downstream heater element 4 are electrically connected to surfaces of the plurality of weld terminals 5 by spot welding, respectively. Further to the weld terminals 5, conductive wires 7 for supplying a current to the upstream heater element 3 and the downstream heater element 4 and for measuring a change of an electric resistance value are electrically connected. Thus, the weld terminals 5 function as input-output terminals for supplying a current to the upstream heater element 3 and the downstream heater element 4 and for measuring a change of an electric resistance value. The weld terminal 5 is generally made of phosphor bronze which is easy to be processed and whose electrical conductivity is high, and the like.

Concerning the weld terminal used for the general electrical connection, the configuration of the weld terminal which allows the stable electrical connection by spot welding is previously known. For example, Japanese Patent Application Laid-Open No. H5-166575 discloses a method that when a weld terminal is connected to a conductor of a flat electric wire by spot welding, the weld terminal is pressed on the conductor at an always fixed welding pressure using a presser plate and an excessive current flows through the ground connected to the presser plate, which stabilizes a contact resistance of the conductor and the weld terminal to perform consistently satisfactory spot welding. The weld terminal used for this method is formed by performing nickel plating so as to be 1.5 µm thick on a surface of a substrate made of phosphor bronze as a ground layer, and then performing gold plating so as to be 1 µm thick thereon.

Moreover, for example, Japanese Patent Application Laid-Open No. 2008-218189 discloses a method that when a weld terminal obtained by performing nickel plating on a substrate made of brass as an ground layer and then performing tin plating thereon is spot-welded to a lead frame made of 42 Alloy, a part of the plated layer of the weld terminal is removed and then the weld terminal with the substrate being exposed is spot-welded to the lead frame, which forms a fusion zone in both of the substrate and the lead frame and prevents the weld peeling effectively.

SUMMARY OF THE INVENTION

An Fe (iron)-Ni (nickel) alloy wire can be preferably used for the heating resistance wires which constitute the upstream heater element 3 and the downstream heater element 4 of the thermal mass flow meter, as described below.

When the Fe—Ni alloy wire is spot-welded to the weld terminal made of phosphor bronze for example, the problem may, however, occur that it is difficult to find out a welding condition which allows the suitable welding even if a welding condition of spot welding is tried to be optimized, and when the heating resistance wire is pulled, it may be easily peeled from the weld terminal because of the insufficient connection.

When the welding condition is changed in order to increase connection strength, even if the heating resistance wire can be satisfactorily spot-welded to the weld terminal, the problem may, however, occur that a part of the weld terminal may melt and adhere to an electrode of a spot welding machine (hereinafter refer to an "electrode"), and the weld terminal and the electrode may weld, which remarkably decreases the working efficiency.

The present invention has been made in consideration of the above-mentioned problems, and an object thereof is to provide a thermal mass flow meter comprising a weld terminal which allows the stable spot welding of a heating resistance wire and which does not cause the welding with an electrode easily.

The present inventor has investigated the cause of the problems occurring when the heating resistance wire is spot-welded to the weld terminal in the thermal mass flow meter. As a result, it has been suggested that there is a large difference between the heating resistance wire formed of the Fe—Ni alloy wire and the weld terminal made of phosphor bronze regarding a melting point of a material and a heat capacity resulting from a difference of the respective sizes, therefore, it is difficult for the heating resistance wire and the weld terminal to melt in a balanced manner to form a fusion zone.

Then, as a material of the weld terminal, Fe—Ni based alloy was employed which has a melting point close to the melting point of the Fe—Ni alloy wire. It is found that even though there is still a large difference regarding the heat capacity resulting from the difference of the respective sizes of the heating resistance wire and the weld terminal, a welding condition exists which allows the relatively stable spot welding with the heating resistance wire, as compared to the weld terminal made of phosphor bronze.

In a case of the above welding condition, a new problem of remarkably decreasing the working efficiency has, however, occurred, such that at the same time the heating resistance wire is connected to a surface of the weld terminal, a part of the opposite surface of the weld terminal may melt and adhere to the electrode and also the weld terminal and the electrode may weld.

Then, as a result that the present inventor has further devoted himself/herself to investigate a means for preventing the welding with an electrode, the present inventor has found that a coat layer is provided on the surface of the weld terminal, which prevents the welding with the electrode without losing the stability of spot welding with the Fe—Ni alloy wire, and then has completed the present invention.

That is, the present invention is an invention of a thermal mass flow meter, comprising the sensor section of the above configuration, wherein each of the weld terminals is made of metal or alloy having a melting point, a temperature difference between the melting point and a melting point of the heating resistance wire not exceeding 100 degrees Celsius, and one or more of coat layer(s) is provided in a surface of each of the weld terminals.

Moreover, the present invention is an invention of a mass flow controller comprising the above thermal mass flow meter.

According to the configuration of the thermal mass flow meter according to the present invention, the end of heating resistance wire can be stably spot-welded to the weld terminal, which allows the reliable electrical connection of the heating resistance wire and the weld terminal, and hence which improves the reliability of the thermal mass flow meter and the whole mass flow controller comprising the same.

The above and further objects and features of the invention will more fully be apparent from the following detailed description with accompanying drawings.

DETAILED DESCRIPTION

Hereinafter, the modes for carrying out the present invention will be described in more detail. It is noted that the following explanation is merely exemplification and the modes for carrying out the present invention are not limited to the following modes.

First, the welding method in the present invention is explained. The spot welding used in the present invention is one mode of resistance welding, and is a welding method in which two metal members to be welded are sandwiched between two electrodes facing each other and a current is applied to the metal members while a welding pressure is applied to the electrodes, which melts a contact portion of the members by resistance heat, and then, the current is stopped, which cools the members and solidifies the same to form a connection portion called a nugget. Although it is common to weld plate materials each other in the spot welding, the spot welding of the present invention is different from the general spot welding concerning a formation method and a shape etc. of the nugget because a thin wire is welded to a surface of a plate-shaped weld terminal.

Figure 2A:
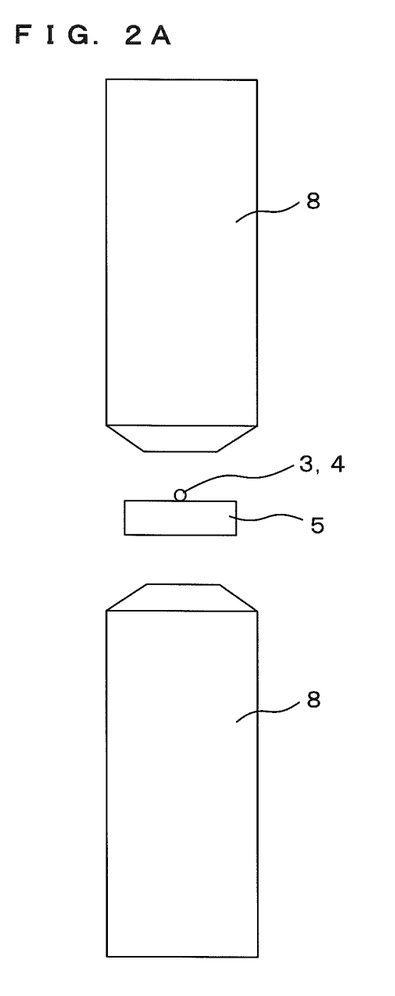
FIG. 2A is a schematic view explaining the procedure of spot welding.
Figure 2B:
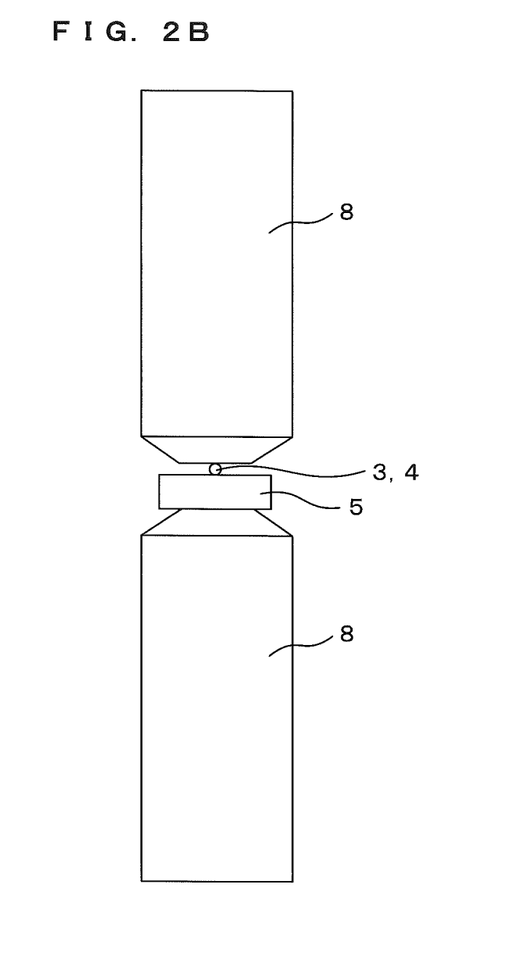
FIG. 2B is a schematic view explaining the procedure of spot welding.
Figure 2C:
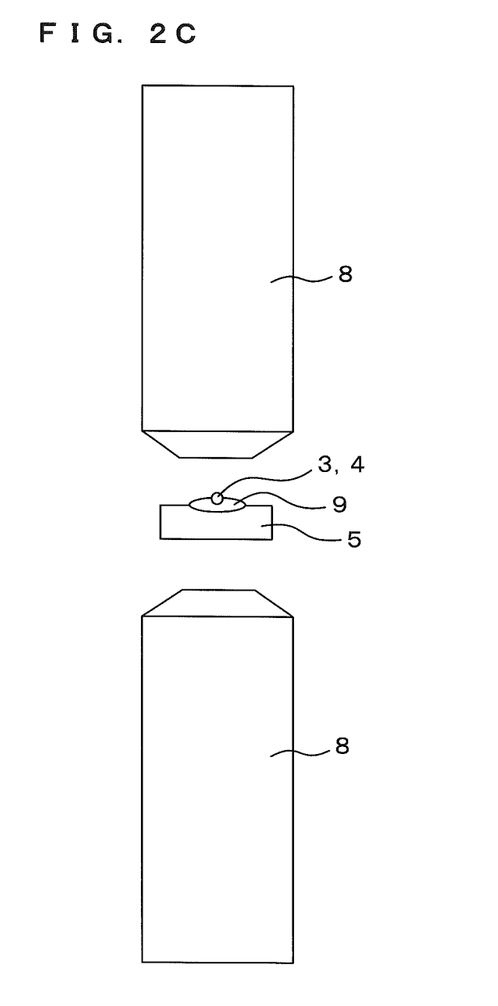
FIG. 2C is a schematic view explaining the procedure of spot welding.

FIG. 2A, FIG. 2B and FIG. 2C are schematic views showing a construction example of the spot welding of the heating resistance wire and the weld terminal in the present invention. First, an end of the heating resistance wire constituting the upstream heater element 3 or the downstream heater element 4 is set to the surface of the weld terminal 5 (FIG. 2A). Next, the weld terminal 5 and the end of the heating resistance wire are sandwiched by heads of two electrodes 8 arranged vertically using a foot lever, etc., and a current is applied to the electrodes 8 while a welding pressure is applied. For this reason, a contact resistance is large in a portion where the end of the heating resistance wire contacts the head of the upper electrode 8 and the surface of the weld terminal 5, and therefore these members are heated by resistance heat (FIG. 2B). Then, at the same time the surface of the weld terminal 5 melts locally, a part of a surface of the end of heating resistance wire also melts, and both are integrated with each other and then are cooled and solidified to form a nugget 9 which is swelled on the surface of the weld terminal 5. In this manner, the welding is completed (FIG. 2C).

Figure 3:
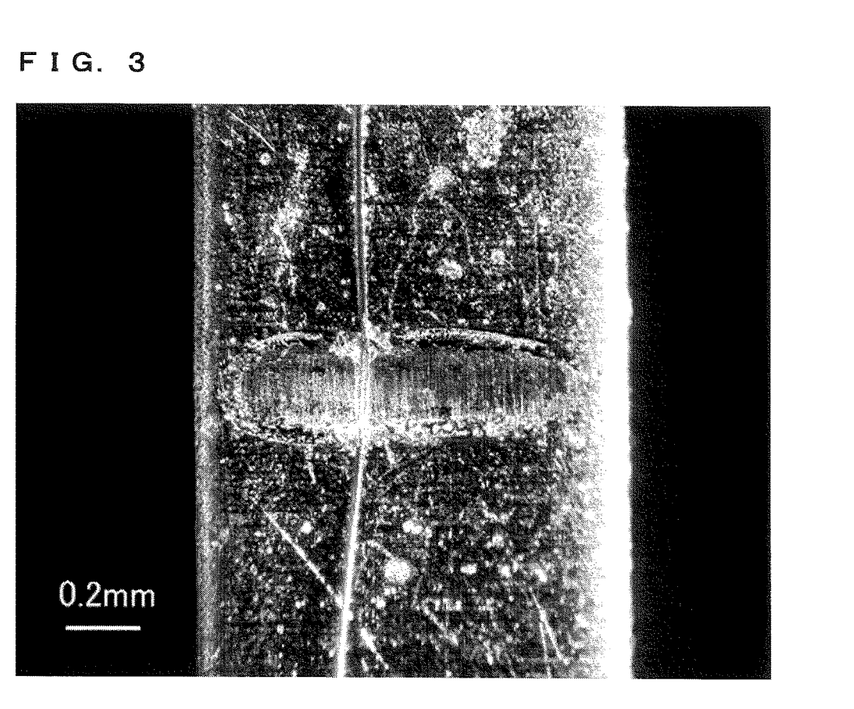
FIG. 3 is a photograph substituted for drawing showing a construction example of the spot welding of a heating resistance wire and a weld terminal.

FIG. 3 is a photograph substituted for drawing showing a construction example of spot welding of a heating resistance wire and a weld terminal. A swelled portion which is shown in a central portion of the photograph is the nugget formed on the surface of the weld terminal. The end of the heating resistance wire extended from an upper portion of the photograph is welded in a central portion of the nugget while a shape of the heating resistance wire is maintained. In contrast to the case where plate materials are spot-welded to each other, in the case where the heating resistance wire is spot-welded to the weld terminal, the heating resistance wire may be burned out if heating is performed so as to melt even a central portion of the heating resistance wire. Accordingly, it is necessary to perform heating on a welding condition that a part of a surface of a heating resistance wire only melts. When a wire diameter of a heating resistance wire is small, it is generally difficult to find out such a suitable welding condition. It is possible to control the welding condition of spot welding by changing a welding time, a current value, a welding pressure, etc. of the spot welding.

Next, a material of the heating resistance wire used in the present invention is explained. It is preferred to use a Fe—Ni alloy wire for the heating resistance wire which constitutes the upstream heater element 3 and the downstream heater element 4. The reason why the Fe—Ni alloy wire is preferred is that an oxidation resistance in high temperature is superior, a temperature coefficient of an electric resistance is relatively high, a thermal expansion coefficient is small and an internal stress increase is minor even in a case of temperature change. Concerning a composition range of the Fe—Ni alloy wire, if a range of Ni is less than 30 mass %, the oxidation resistance in high temperature is inferior, and if it is more than 80 mass %, the thermal expansion coefficient is high and the internal stress easily increases, therefore, it is preferred that the range of Ni is equal to or more than 30 mass % and equal to or less than 80 mass % and a range of Fe is the remainder. When the oxidation resistance in high temperature is especially required, it is more preferred that the range of Ni is equal to or more than 60 mass % and equal to or less than 80 mass %. When the reduction of the thermal expansion coefficient is especially required, it is more preferred that the range of Ni is equal to or more than 30 mass % and equal to or less than 45 mass %. Among others, the Fe—Ni alloy wire containing Ni of 70 mass % and Fe of the remainder has a favorable balance in all respects, and is suitable as the material of the heating resistance wire. It is noted that the heating resistance wire needs to be coiled around an outer periphery of the sensor tube, therefore, it is preferred to cover a surface thereof with an insulating film. As the insulating film used for covering, a film made of polyimide resin which is superior in thermal resistance is preferred, for example.

Concerning the wire diameter of the heating resistance wire, if it is less than 5 µm, a mechanical strength is insufficient and it is difficult to handle it, and if it exceeds 100 µm, the electric resistance per unit length is low and heat conductance with the sensor tube is also inferior. For these reasons, it is preferred that the wire diameter of the heating resistance wire is equal to or more than 5 µm and equal to or less than 100 µm. The more preferred range of the wire diameter is equal to or more than 10 µm and equal to or less than 70 µm.

Next, a difference of a melting point of metal or alloy which constitutes the heating resistance wire and the weld terminal, which is the feature of the present invention, is explained. In the present invention, a material of the weld terminal is metal or alloy having a melting point, a temperature difference $\Delta T$ between the melting point and a melting point of the heating resistance wire not exceeding 100 degrees Celsius. If the temperature difference $\Delta T$ exceeds 100 degrees Celsius, the heating resistance wire cannot be appropriately welded to the surface of the weld terminal even on any welding condition of spot welding. Specifically, if the welding condition is adjusted so as to heat more, the heating resistance wire may be burned out, and on the contrary, if the welding condition is adjusted so as to heat less, the connection strength of the heating resistance wire and the weld terminal is weak, which may peel them easily. For this reason, it is difficult to find out the welding condition for connecting the heating resistance wire with the weld terminal at a sufficient strength without burning out the heating resistance wire. Although this reason is not clear, the following reason is assumed that as compared with the case where plate materials are spot-welded to each other, in the case of the present invention where the heating resistance wire is spot-welded to the weld terminal, both heat capacities are extremely different from each other due to a difference between shapes of members to be welded, therefore, a heat balance is inferior at the time of heating and heat radiation and the heating resistance wire with a small heat capacity tends to be heated more excessively. For this reason, in the present invention, the temperature difference $\Delta T$ between the melting points is set not so as to exceed 100 degrees Celsius. An upper limit of a more preferred As a specific means for setting a magnitude of the temperature difference $\Delta T$ to 100 degrees Celsius or less, it is preferred to choose the same alloy system for the materials of the heating resistance wire and the weld terminal, or to choose the closest possible composition in a case where the same alloy system is chosen. For example, when the Fe—Ni alloy wire is used for the heating resistance wire, it is preferred to choose the Fe—Ni alloy which is the same alloy system for the material of the weld terminal. In the Fe—Ni alloy, a temperature of a liquidus line in a binary phase diagram falls within 1450±25 degrees Celsius in a range of Ni of 30 mass % or more and 80 mass % or less, therefore, both of the heating resistance wire and the weld terminal are made of Fe—Ni alloy of this composition range, which can set the magnitude of the temperature difference $\Delta T$ to 50 degrees Celsius or less. Moreover, since the same alloy system is chosen for the materials of the heating resistance wire and the weld terminal, the values of thermal conductivity differ little, therefore, it is preferred also in terms of the heat balance. When the Fe—Ni alloy is chosen as a material of the weld terminal, it is preferred to choose 42 Alloy containing Ni of 42 mass % and Fe of the remainder, for example. There is advantages that 42 Alloy is relatively easily spot-welded with a Fe—Ni alloy wire, is widely prevalent as a material of a lead frame and is relatively easily-available.

Next, a coat layer of the weld terminal which is the feature of the present invention is explained. When materials are chosen so that the temperature difference $\Delta T$ between the melting point of the heating resistance wire and that of the weld terminal does not exceed 100 degrees Celsius to perform spot welding, the satisfactory welding of the heating resistance wire and the weld terminal is attained, as described above. However, almost at the same time the heating resistance wire is welded to the weld terminal, resistance heating occurs also between a surface opposite to a surface to be welded of the weld terminal and a surface of an electrode which is pressed against it. For this reason, a part of the surface of the weld terminal may melt to contaminate the electrode, or the welding may occur between the both. Although this reason is not clear, the following reason is assumed that when the heating resistance wire and the weld terminal melts respectively to form a nugget, the contact resistance in that portion decreases and an excessive current flows, and then the resistance heating also increases between the surface of the electrode and the surface of the weld terminal which are not assumed at the beginning.

Accordingly, in the present invention, one or more coat layers are provided on the surface of the weld terminal in order to prevent the above undesirable welding. The coat layer is avoided because it interferes with welding when plate materials are spot-welded to each other. For example, as disclosed in Japanese Patent Application Laid-Open No. 2008-218189, there is a case where it is preferred to intentionally remove a portion to be welded of the coat layer before welding and to expose a substrate. However, in the spot welding of the heating resistance wire and the weld terminal like the present invention, the coat layer provided on the surface of the weld terminal does not interfere with the spot welding, and prevents the undesirable welding with the electrode by contraries. In this manner, the present invention brings a distinctive effect. Although this reason is not clear, the following reason is assumed that the coat layer is provided on the surface of the weld terminal, which stabilizes an electric resistance value between the weld terminal and the electrode as compared with the case where there is no coat layer, and the generation of a spark and the welding do not easily occur between the weld terminal and the electrode.

It is preferred that Cu (copper) or Au (gold) whose melting point is not so high and which is superior in electrical conductivity is used for a material of the coat layer of the weld terminal. Since Cu and Au are superior in electrical conductivity, they can decrease the contact resistance between the weld terminal and the electrode to prevent the welding effectively. Moreover, the electric resistance of the weld terminal itself is decreased to prevent the generation of heat, which increases the measurement accuracy of the thermal type flow meter, and decreases power consumption. Moreover, since the melting points of Cu and Au are higher than the melting point of Sn (tin) often used as a coat layer, Cu and Au have advantages that the formation of the whisker at high temperature as often seen in the case where Sn is used for the coat layer does not easily occur. Since the coat layer made of Au is extremely superior in oxidation resistance, an oxide is not formed in a surface and the contact resistance can be kept low and stable. Moreover, the effect of preventing the welding of the weld terminal and the electrode, the effect of ensuring the wettability of solder at the time of soldering a conductive wire to a weld terminal, and the like are especially superior, therefore, the coat layer of Au is more preferred.

If the thickness of the coat layer of the weld terminal is less than 0.05 µm, the effect of preventing the welding cannot be acquired, and if it exceeds 5.0 µm, the welding to the heating resistance wire is disturbed, therefore, the thickness of the coat layer is preferred to be equal to or more than 0.05 µm and equal to or less than 5.0 µm. The more preferred thickness of the coat layer is equal to or more than 0.1 µm and equal to or less than 3.0 µm or less.

Although the coat layer may be provided as a monolayer, a ground coat layer may be first provided on a surface of a weld terminal, and then a surface coat layer may be further provided on the surface in order to improve the adhesion with the surface of the weld terminal. For example, when the coat layer made of Ni is first provided as a ground coat layer between the weld terminal made of 42 Alloy and the coat layer made of Au, it is preferred that the adhesion increases as compared with the case where the coat layer made of Au is directly provided on the surface of the weld terminal. If the thickness of the ground coat layer in this case is less than 0.05 µm, the effect of improving the adhesion cannot be acquired, and if it exceeds 5.0 µm, the welding to the heating resistance wire is disturbed, therefore, it is preferred that the thickness of the ground coat layer is set to be equal to or more than 0.05 µm and equal to or less than 5.0 µm. It is also preferred to provide an intermediate layer between the ground coat layer and the surface coat layer in order to further improve the adhesion. Thus, when two or more of the coat layers are formed, the welding with the heating resistance wire is disturbed in a case of the thickness of the whole coat layers exceeding 5.0 µm, therefore, it is preferred that the thickness of the whole coat layers is equal to or less than 5.0 µm.

The coat layer may be provided on the whole surface of the weld terminal, and the coat layer may be provided in a part of the weld terminal if available. Because the coat layer is provided in order to prevent the welding of the weld terminal and the electrode, it is necessary to provide the coat layer at least in a portion, where the electrode directly contacts, of the surface of the weld terminal when the coat layer is provided in a part of the weld terminal.

For a means for providing the coat layer, a well-known means, such as electrolytic plating, electroless plating, sputtering, and vapor deposition can be used. When the coat layer is provided on the whole surface of the weld terminal, it is preferred to use electrolytic plating in terms of the working efficiency, the homogeneity and the adhesion of the coat layer, and the like. Moreover, when the coat layer is provided in the part only of the weld terminal, it is preferred to use a means, such as sputtering, vapor deposition.

Figure 4:
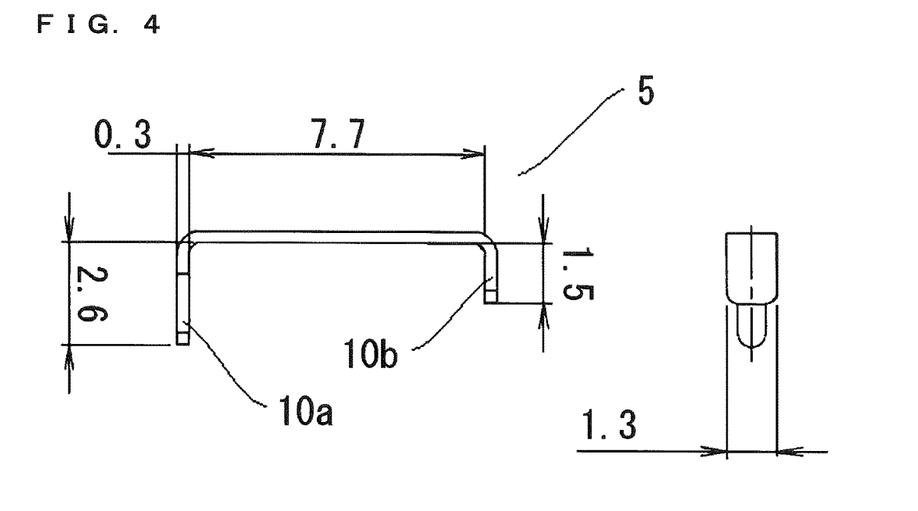
FIG. 4 is a view showing an example of a shape of the weld terminal.

Next, a preferred shape of the weld terminal is explained. Although the shape of the weld terminal is not especially limited, it is generally preferred to use the weld terminal obtained by processing a flat plate into a predetermined shape. The shape of the flat plate allows the reliable sandwiching by the electrodes arranged vertically at the time of spot welding. Generally the nugget in the spot welding is formed in a planar portion of the weld terminal, and the end of the heating resistance wire is electrically connected to a surface of the nugget. A projecting part may be provided in the weld terminal as needed in order to facilitate the combination with other member or to realize an electrical connection with a conductive wire. FIG. 4 shows an example of a shape of a weld terminal where projecting parts are provided in both ends obtained by bending a flat plate. A shorter projecting part 10*b* of the projecting parts is inserted into a hole provided in a mold 6 shown in FIG. 1, and functions to fix the weld terminal to the mold 6. A longer projecting part 10*a* thereof is inserted into other hole provided in the mold 6, and a conductive wire 7 is electrically connected to a tip of the projecting part 10*a* by soldering.

Concerning the number of the weld terminals, the required number of the weld terminals may be provided according to the number of the sensor elements. For example, in an example shown in FIG. 1, one weld terminal is used for each end of the heating resistance wires constituting the upstream heater element 3 and the downstream heater element 4, therefore, a total of four weld terminals are used. This is due to the reliable spot welding of the respective ends of the heating resistance wires. According to a configuration of an electrical circuit, ends of a plurality of heating resistance wires may be spot-welded to one weld terminal, which can reduce the number of the weld terminals per thermal mass flow meter.

In the present invention, for a device for spot welding, known spot welding machines can be used, such as a table-top type spot welding machine, a foot-operated spot welding machine, or an air-actuated spot welding machine. For the electrode, a round bar-shaped electrode can be used which is made of tungsten etc. and whose diameter is about 10 mm, for example. As an example of the typical welding condition of the spot welding in the present invention, a weld time is about 2 to 10 cycles, the welding pressure is about 10 to 50 kg and a current is about 2 to 10 kA. In order to find out a preferable welding condition, there is a means of pulling a welded heating resistance wire by hand to check whether or not the welded heating resistance wire is peeled while changing the welding condition, for example. The means allows the establishment of the welding condition for obtaining the sufficient connection strength.

EXAMPLE

A plate material 0.3 mm thick made of 42 Alloy was processed to prepare a material of a weld terminal having a shape shown in FIG. 4. First, electrolytic nickel plating was performed so as to be 3.0 µm thick on the whole surface of the obtained material, and next, electrolytic gold plating was performed so as to be 0.2 µm thick to prepare a weld terminal made of 42 Alloy and provided with coat layers which are formed of two layers of nickel and gold.

Also, as a heating resistance wire, a Fe—Ni alloy wire (containing nickel of 70 mass % and Fe of the remainder) was prepared whose wire diameter was 15 µm and which included an insulating film made of polyimide resin.

A melting point of the material of the prepared weld terminal is 1450 degrees Celsius, a melting point of the heating resistance wire is 1440 degrees Celsius, therefore, a temperature difference ΔT between both is 10 degrees Celsius.

The prepared heating resistance wire was coiled around two parts of an outer periphery of a sensor tube to form an upstream heater element and a downstream heater element respectively. Then, the prepared weld terminal was set to a foot-operated spot welding machine and an end of the heating resistance wire was set to a surface thereof parallel to the surface, and subsequently the weld terminal and the heating resistance wire were sandwiched between tungsten electrodes arranged vertically and a welding pressure was applied to them by a foot lever. A current is applied to the electrodes on a condition that a current value is 4.0 kA and a resistance welding time was two cycles to perform spot welding.

When the welding pressure applied to the electrodes was decreased after spot welding, the weld terminal could be easily removed from the electrodes. Heads of the tungsten electrodes were clean after the weld terminal was removed, and the adhesion of a fused material of the weld terminal, etc. was not seen there.

In the observation of the welded portion obtained after spot welding with an optical microscope, the heating resistance wire is welded near a central portion of a nugget formed on the surface of the weld terminal as shown in FIG. 3, and near the nugget the coat layer of the weld terminal and the insulating film of the heating resistance wire were destroyed completely. When the heating resistance wire obtained after spot welding was pulled by hand, the heating resistance wire was firmly connected to the weld terminal and was not peeled at all. Moreover, in the observation of a surface opposite to the welded portion of the weld terminal obtained after spot welding, a trace of the tungsten electrode was hardly seen, and the surface was in a clean state.

Comparative Example 1

Except that a weld terminal is used which is formed of the same material of the weld terminal as the above Example but a coat layer is not provided on the material of the weld terminal, spot welding of a heating resistance wire was performed on the same condition as the above Example.

When a welding pressure applied to the electrodes was decreased after spot welding, among surfaces of the weld terminal, a surface opposite to the welded portion was welded on a surface of the lower tungsten electrode, and could not be easily removed from the electrode. When the weld terminal was forcedly removed from the lower tungsten electrode by using pliers, the weld terminal was peeled off in a state where a part of the surface of the weld terminal remains welded on the head of the electrode, and a circular depressed portion was formed in the weld terminal whose surface was peeled off. Moreover, since the next spot welding cannot be performed in a case where a part of a surface of a weld terminal remains welded on a head of a tungsten electrode, a part of welded weld terminal had to be ground using a file and removed.

On the other hand, since the weld strength of the heating resistance wire and the weld terminal was satisfactory, the welding condition was changed in order to prevent the welding of the weld terminal and the electrode. However, when a current value between the electrodes was reduced, the welding of the weld terminal and the electrode could be prevented to some extent, but the weld strength of the heating resistance wire and the weld terminal might be decreased, and when the heating resistance wire was pulled by hand after spot welding, it was easily peeled off. Moreover, when the current value between the electrodes was increased, the welding of the weld terminal and the electrode was increasingly firm. For this reason, the suitable welding condition could not be found out that the heating resistance wire can be spot-welded to the weld terminal while the welding of the weld terminal and the electrode is prevented.

Comparative Example 2

A plate material 0.3 mm thick made of phosphor bronze was processed to prepare a material of a weld terminal having a shape shown in FIG. 4. First, electrolytic nickel plating was performed so as to be 3.0 μm thick on the whole surface of the obtained material, and next, electrolytic gold plating was performed so as to be 0.2 μm thick to prepare a weld terminal made of phosphor bronze and provided with coat layers which are formed of two layers of nickel and gold.

Also, as a heating resistance wire, a Fe—Ni alloy wire (containing Ni of 70 mass % and Fe of the remainder) was prepared whose wire diameter was 15 μm and which included an insulating film made of polyimide resin.

A melting point of the prepared material of the weld terminal is 980 degrees Celsius, a melting point of the heating resistance wires is 1440 degrees Celsius, therefore, a temperature difference ΔT between both is 460 degrees Celsius.

Spot welding was performed on the same welding condition as the above Example using the obtained weld terminal made of phosphor bronze. When the heating resistance wire obtained after the spot welding was pulled by hand, it was easily peeled off. Therefore, it is found that the weld strength was not sufficient.

Then, when a current value between the electrodes was increased in order to improve the weld strength, the heating resistance wire melted all the way to a central portion of the welded portion, and then was cut. For these reasons, the suitable welding condition could not be found out that the heating resistance wire could be spot-welded to the weld terminal while the disconnection due to melting of the heating resistance wire was prevented.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A thermal mass flow meter, comprising:
   a sensor tube configured to transport a fluid;
   an upstream heater element and a downstream heater element which are formed of heating resistance wires provided in an outer periphery of the sensor tube; and
   a plurality of weld terminals having a plate shape and electrically connected to ends of the heating resistance wires by spot welding,
   wherein each of the weld terminals is made of metal or alloy having a melting point, a temperature difference between the melting point and a melting point of the heating resistance wire not exceeding 100 degrees Celsius, each of the heating resistance wires is formed of an Fe-Ni alloy wire whose wire diameter is equal to or more than 5 μm and equal to or less than 100 μm;
one or more of coat layer(s) is provided on a surface of each of the weld terminals, and
a nugget is formed on a portion of the surface of each of the weld terminals by integrating a part of the surface of the weld terminal and a part of a surface of an end of a respective heating resistance wire,
the end of the respective heating resistance wire is welded on the nugget; and
the coat layer does not exist at the portion on which the nugget is formed.

2. The thermal mass flow meter according to claim 1, wherein, and
the coat layer is provided on each of the weld terminals at least in a portion located on an opposite surface from the portion on which the nugget is formed.

3. The thermal mass flow meter according to claim 1, wherein materials of the heating resistance wire and the weld terminal are alloy containing the same component.

4. The thermal mass flow meter according to claim 1, wherein each of the weld terminals is made of Fe-Ni alloy.

5. The thermal mass flow meter according to claim 1, wherein the coat layer located in an outermost portion of the one or more coat layer(s) is made of Cu or Au.

6. The thermal mass flow meter according to claim 5, wherein the coat layers are formed of two layers of a ground coat layer made of Ni and a surface coat layer made of Au.

7. A mass flow controller comprising:
a thermal mass flow meter,
wherein the thermal mass flow meter includes:
    a sensor tube configured to transport a fluid;
    a control valve to control a mass flow of the fluid;
    an upstream heater element and a downstream heater element which are formed of heating resistance wires provided in an outer periphery of the sensor tube; and
    a plurality of weld terminals having a plate shape and electrically connected to ends of the heating resistance wires by spot welding,
    wherein each of the weld terminals is made of metal or alloy having a melting point, a temperature difference between the melting point and a melting point of the heating resistance wire not exceeding 100 degrees Celsius,
    each of the heating resistance wires is formed of a Fe-Ni alloy wire whose wire diameter is equal to or more than 5 μm and equal to or less than 100 μm,
    one or more of coat layer(s) is provided on a surface of each of the weld terminals,
    a nugget is formed on a portion of the surface of each of the weld terminals by integrating a part of the surface of the weld terminal and a part of a surface of an end of a respective heating resistance wire,
    the end of the respective heating resistance wire is welded on the nugget, and the coat layer, and
    the coat layer does not exist at the portion on which the nugget is formed.

8. A method of manufacturing a thermal mass flow meter, comprising: a sensor tube in which a fluid flows; a heating resistance wire whose wire diameter is equal to or more than 5 pm and equal to or less than 100 pm; a plate-shaped weld terminal made of metal or alloy and having a melting point, a temperature difference between the melting point and a melting point of the heating resistance wire not exceeding 100 degrees Celsius, wherein one or more coat layer(s) is provided on a surface of the weld terminal, the method comprising:
    coiling the heating resistance wire around two parts of an outer periphery of the sensor tube to form an upstream heater element and a downstream heater element respectively;
    setting the weld terminal to a spot welding machine;
    setting an end of the heating resistance wire which constitutes the upstream heater element or the downstream heater element to a surface of the weld terminal;
    sandwiching the weld terminal and the end of the heating resistance wire between two electrodes provided in the spot welding machine; and
    passing a current through the electrodes while applying a welding pressure to the electrodes to perform spot welding,
    a part of the surface of the weld terminal and a part of a surface of the end of the heating resistance wire are melted, integrated and solidified to form a nugget on a portion of the surface of the weld terminal,
    the end of the heating resistance wire is welded on the nugget, and
    the coat layer is destroyed at the portion on which the nugget is formed.

9. The method of manufacturing a thermal mass flow meter according to claim 8,
wherein each of the electrodes is made of tungsten.

10. The method of manufacturing a thermal mass flow meter according to claim 8,
wherein the heating resistance wire is formed of a Fe-Ni alloy wire,
the weld terminal is made of Fe-Ni alloy, and
the coat layers are formed of two layers of a ground coat layer made of Ni and a surface coat layer made of Au.

* * * * *